United States Patent
Camenisch et al.

(10) Patent No.: US 9,813,414 B2
(45) Date of Patent: Nov. 7, 2017

(54) PASSWORD-BASED MANAGEMENT OF ENCRYPTED FILES

(71) Applicant: International Business Machines Corporation, Armonk, NY (US)

(72) Inventors: Jan L. Camenisch, Zurich (CH); Daniel Kovacs, Zurich (CH); Anja Lehmann, Zurich (CH); Gregory Neven, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 151 days.

(21) Appl. No.: 14/953,454

(22) Filed: Nov. 30, 2015

(65) Prior Publication Data
US 2017/0155634 A1   Jun. 1, 2017

(51) Int. Cl.
*H04L 29/06*       (2006.01)
*H04L 9/08*        (2006.01)

(52) U.S. Cl.
CPC ............ *H04L 63/083* (2013.01); *H04L 9/088* (2013.01)

(58) Field of Classification Search
CPC .............................. H04L 63/083; H04L 9/088
USPC ......................................................... 713/183
See application file for complete search history.

(56) References Cited

U.S. PATENT DOCUMENTS

| | | |
|---|---|---|
| 6,829,356 B1 | 12/2004 | Ford |
| 7,359,507 B2 | 4/2008 | Kaliski |
| 2011/0126024 A1* | 5/2011 | Beatson .................. G06F 21/32 713/186 |
| 2014/0281571 A1* | 9/2014 | Federspiel .......... G06F 21/6209 713/189 |

* cited by examiner

*Primary Examiner* — Izunna Okeke
*Assistant Examiner* — Sakinah Taylor
(74) *Attorney, Agent, or Firm* — Cantor Colburn LLP; Daniel Morris

(57) ABSTRACT

Embodiments include methods for managing encrypted files by storing a user password hash including a predetermined function of the user password associated with that user ID and the secret keys. Aspects also include, in response to receipt from a user computer of an input password and a the user ID for a required encrypted file, communicating with authentication servers to implement a key-reconstruction protocol in which each server computes first and second hash values for the required encrypted file. The file management server uses the first hash values to compute an input password hash including the predetermined function of the input password and the secret keys, checks if the input password hash matches the user password hash for the received user ID, and reconstructs the encryption key for the required encrypted file.

16 Claims, 4 Drawing Sheets

PASSWORD-BASED MANAGEMENT OF ENCRYPTED FILES

BACKGROUND

The present invention relates generally to password-based encrypted file management, and more specifically to management of encrypted user files at a server whereby decryption of user files is dependent on authentication of user passwords.

Servers which are accessible to user computers over networks are often required to manage files containing sensitive user information. For example, online services such as booking portals, app-stores, online stores, etc., may store files containing user address details and payment data such as credit card numbers. Another example is where users upload arbitrary files to a server offering a secure storage facility, so that access to files is restricted to the user in question. Clearly, user files should be encrypted in such scenarios, otherwise a security breach would leak the plaintext user data. Data security then relies on security of the cryptographic keys used for encryption of the user files.

Various services and user-side applications are available for encrypting user data before uploading to cloud storage. Encryption keys here are derived from user passwords, with dedicated software/secure storage typically required at user computers. Due to the low entropy of typical user passwords, password-derived keys can be vulnerable to offline attack if the host server is corrupted. In particular, an adversary obtaining some information that allows him to verify whether a password guess was correct, can then use that information to detect the correct password via brute-forcing, i.e. testing all possibilities.

SUMMARY

According to at least one embodiment of the present invention there is provided a server system comprising a file management server and n≥1 authentication servers for communication with the file management server via a network. The file management server is operable for communication with user computers via the network and for managing encrypted files, each encrypting a user file associated with a user ID under a respective encryption key $K_f$ encoding a user password associated with that user ID. Each server of the system stores a respective secret key $k_i$. The file management server stores, for each user ID, a user password hash comprising a predetermined function of the user password associated with that user ID and the secret keys $k_i$. The servers of the system are adapted such that, in response to receipt from a user computer of an input password and a the user ID for a required encrypted file, the file management server communicates with λ authentication servers, 1≤λ≤n, to implement a key-reconstruction protocol. In this key-reconstruction protocol, each server computes first and second hash values, including the secret key $k_i$ thereof, for the required encrypted file. The file management server uses the first hash values to compute an input password hash comprising the predetermined function of the input password and the secret keys $k_i$, checks if the input password hash matches the user password hash for the received user ID, and, if so, reconstructs the encryption key $K_f$ for the required encrypted file. The reconstructed key $K_f$ encodes the input password and reconstruction of the key $K_f$ requires use of the second hash values. The file management server then decrypts the required encrypted file using the reconstructed key $K_f$.

At least one further embodiment of the present invention provides a method for managing encrypted files at a file management server of such a server system.

Embodiments of the invention will be described in more detail below, by way of illustrative and non-limiting example, with reference to the accompanying drawings.

DETAILED DESCRIPTION

Figure 1:
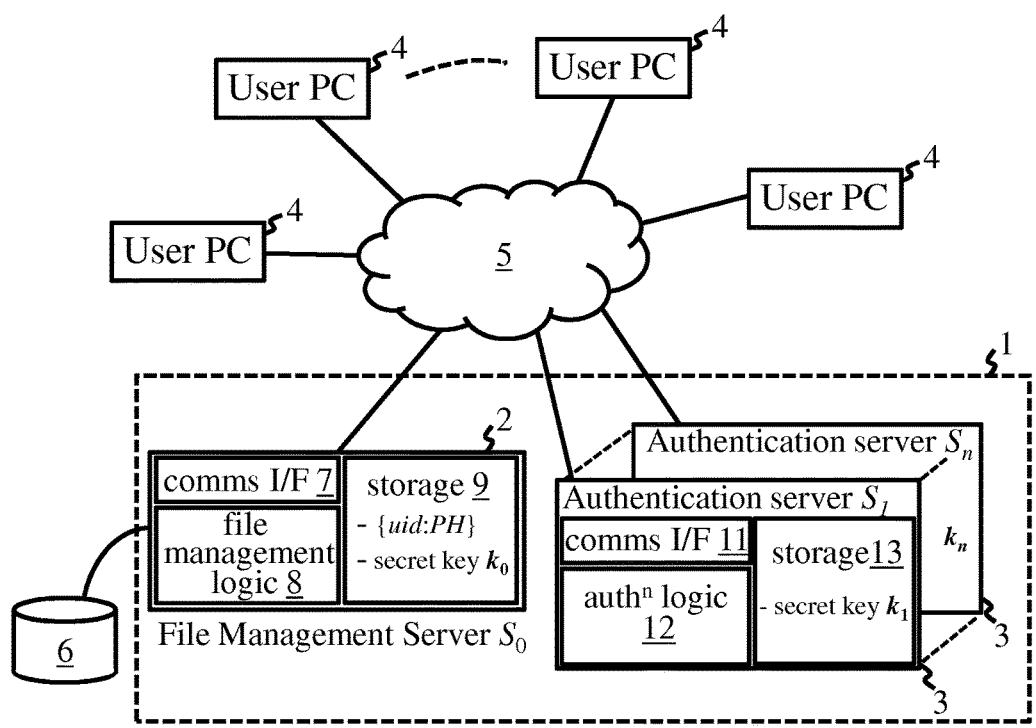
FIG. 1 is a schematic representation of a data processing system including a server system embodying the invention.

FIG. 1 is a schematic block diagram of a data processing system incorporating a server system 1 embodying the invention. The server system 1 comprises a file management server 2, denoted by $S_0$, and a set of n≥1 authentication servers 3, denoted by $S_1$ to $S_n$. The file management server 2 is adapted for communication with the authentication servers 3 and a plurality of user computers 4 via a network 5. The network 5 may in general comprise one or more component networks and/or internetworks, including the Internet. The user computers 4 are shown as general-purpose personal computers (PCs) in this example, but may equally be implemented by other computer devices such as mobile phones, tablet computers, personal music players, palmtop devices, etc. The file management server 2 manages encrypted files which are held in storage, represented by database 6 in the figure, operatively associated with the server 2. Each of these encrypted files encrypts a user file, which is associated with a user ID, under a respective encryption key $K_f$ for that user file. The user IDs (e.g. user names) serve to identify respective users who access the server system 1 via user computers 4 in operation. The encryption key $K_f$ for a given user file encodes a user password, associated with the user ID for that file, along with one or more further values as discussed below. The file management server 2 is adapted to communicate with authentication servers 3 to implement a key-reconstruction protocol and related operations detailed below. In particular, the encryption keys $K_f$ are not stored in server system 1. Decryption of an encrypted file relies on reconstruction of the corresponding encryption key $K_f$ via the key-reconstruction protocol. Reconstruction of keys via this protocol is dependent on authentication of user passwords by file management server 2 as explained below.

The number n of authentication servers can vary for different embodiments. In preferred embodiments, n>1. In general, higher values of n offer greater system security, and the value of n can be selected as desired depending on the particular protocol operation and required level of security. The authentication servers 3 may be located at the same location as file management server 2 or at one or more different locations, and may be controlled by the same entity as the file management server or by one or more different entities. Distribution and control of the servers 2, 3 can thus be selected according to security requirements for a given system.

A high-level abstraction of functional components of the servers 2, 3 is shown in FIG. 1. File management server 2 is indicated as comprising a communications interface (I/F) 7 for communications via network 5, file management logic 8, and storage 9. The file management logic 8 provides functionality for implementing steps of the key-reconstruction and related operations detailed below. In general, this control logic can be implemented in hardware or software or a combination thereof. Storage 9 stores various data used by the control logic 8 in operation. This includes a password data set {uid:PH} containing a user password hash PH, described further below, for the user ID uid of each registered user of server system 1. The file management server 2 also stores a cryptographic key $k_0$ which is secret to server 2. Each authentication server 3 is similarly shown as comprising a communications interface 11, authentication logic 12 and storage 13. The authentication logic 12 (which can again be implemented in hardware or software or a combination thereof) provides functionality for use in the key-reconstruction and related operations described below. Storage 13 stores data used by authentication logic 12 in operation. In particular, each authentication server $S_1$ to $S_n$ stores a respective cryptographic key $k_1$ to $k_n$ which is secret to that server.

Each of the functional blocks of servers 2, 3 in FIG. 1 may be implemented in general by one or more functional components which may be provided by one or more computers. In particular, each of servers 2, 3 may be implemented by computing apparatus comprising one or more general- or special-purpose computers, each comprising one or more (real or virtual) machines, providing functionality for implementing the operations described herein. Exemplary implementations will be described further below. The file management and authentication logic 8, 12 of these servers may be described in the general context of computer system-executable instructions, such as program modules, executed by a computing apparatus. Generally, program modules may include routines, programs, objects, components, logic, data structures, and so on that perform particular tasks or implement particular abstract data types. The computing apparatus may be practiced in distributed cloud computing environments where tasks are performed by remote processing devices that are linked through a communications network. In a distributed cloud computing environment, data and program modules may be located in both local and remote computer system storage media including memory storage devices. The database 6 containing encrypted files may be similarly provided in any storage operatively associated with file management server 2, including local and remote storage media.

Figure 2:
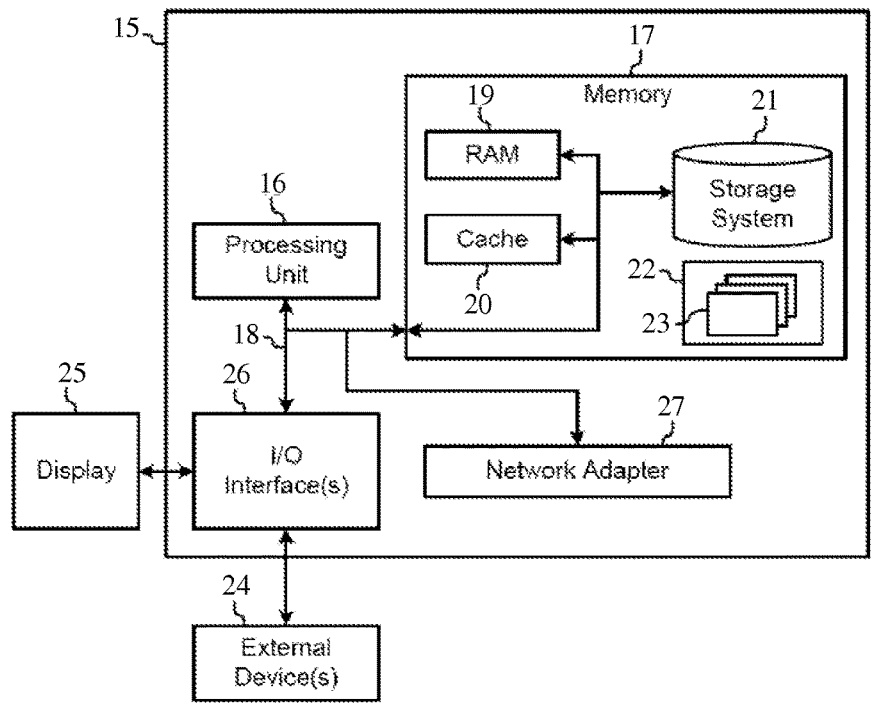
FIG. 2 is a generalized schematic of a computer in the server system of FIG. 1.

FIG. 2 is a block diagram of exemplary computing apparatus for implementing a computer of server system 1. The computing apparatus is shown in the form of a general-purpose computer 15. The components of computer 15 may include processing apparatus such as one or more processors represented by processing unit 16, a system memory 17, and a bus 18 that couples various system components including system memory 17 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 15 typically includes a variety of computer readable media. Such media may be any available media that is accessible by computer 15 including volatile and non-volatile media, and removable and non-removable media. For example, system memory 17 can include computer readable media in the form of volatile memory, such as random access memory (RAM) 19 and/or cache memory 20. Computer 15 may further include other removable/non-removable, volatile/non-volatile computer system storage media. By way of example only, storage system 21 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 18 by one or more data media interfaces.

Memory 17 may include at least one program product having one or more program modules that are configured to carry out functions of embodiments of the invention. By way of example, program/utility 22, having a set (at least one) of program modules 23, may be stored in memory 17, as well as an operating system, one or more application programs, other program modules, and program data. Each of the operating system, one or more application programs, other program modules, and program data, or some combination thereof, may include an implementation of a networking environment. Program modules 23 generally carry out the functions and/or methodologies of embodiments of the invention as described herein.

Computer 15 may also communicate with: one or more external devices 24 such as a keyboard, a pointing device, a display 25, etc.; one or more devices that enable a user to interact with computer 15; and/or any devices (e.g., network card, modem, etc.) that enable computer 15 to communicate with one or more other computing devices. Such communication can occur via Input/Output (I/O) interfaces 26. Also, computer 15 can communicate with one or more networks such as a local area network (LAN), a general wide area network (WAN), and/or a public network (e.g., the Internet) via network adapter 27. As depicted, network adapter 27 communicates with the other components of computer 15 via bus 18. It should be understood that although not shown, other hardware and/or software components could be used in conjunction with computer 15. Examples include, but are not limited to: microcode, device drivers, redundant processing units, external disk drive arrays, RAID systems, tape drives, and data archival storage systems, etc.

The user files encrypted in system 1 may be uploaded by users for secure storage or may otherwise contain security-sensitive information associated with respective users, such as payment data for use in user transactions. Encryption keys $K_f$ are generated, and user files are encrypted and stored in database 6, as part of a setup procedure described below. Decryption of a file stored in database 6 may be initiated at request of a user, e.g. to retrieve a file previously uploaded by the user, or initiated by file management server 2 for use in some interaction with a user, e.g. to retrieve payment data for a transaction. To decrypt a required file, the encryption key $K_f$ for that file must be reconstructed by server system 1. To reconstruct the key $K_f$, file management server 2 must first authenticate a user password p previously registered with server 2 for the user in the setup procedure described below. This setup procedure involves generation of the user password hash PH which is stored in password data set {uid:PH} for that user. The user password hash PH comprises a predetermined function, denoted by F in the following, of the user password p associated with the user's ID uid and the secret keys $k_i$ of servers $S_0$ to $S_n$. This user password hash PH is then used to authenticate a user password in the subsequent key-reconstruction protocol.

Figure 3:
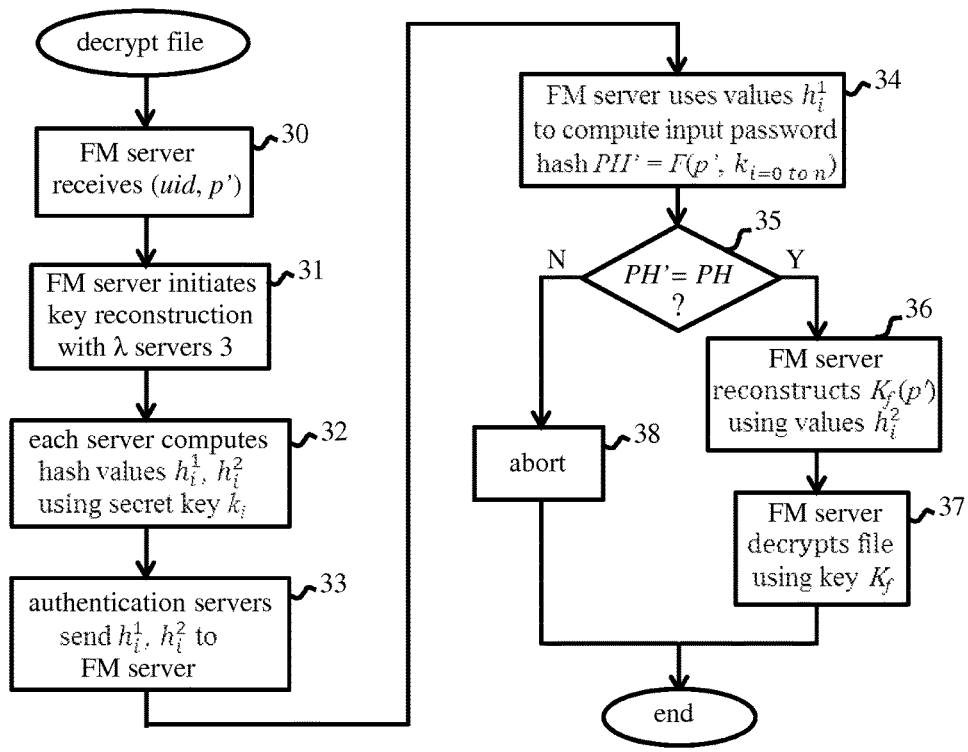
FIG. 3 indicates steps performed in a key-reconstruction operation of the server system.

FIG. 3 gives an overview of the main steps performed by server system 1 in the key-reconstruction operation for decryption of a required file. Note that, in this and subsequent flow diagrams, steps may be performed in a different order to that shown, and some steps may be performed concurrently as appropriate. (For simplicity, operation will be described here for a scenario in which a single encrypted file is stored for a given user. However, system operation can readily accommodate a plurality of files per user as explained below). The file decryption process requires a user to connect to file management (FM) server 2 from a user computer 4 over network 5. The user supplies his user ID uid and an input password p' (i.e. an attempt at his user password p as previously registered with FM server 2 in the setup procedure). The login data (uid, p') is received by FM server 2 in step 30 of FIG. 3. In step 31, the control logic 8 of FM server 2 initiates the key-reconstruction protocol. This protocol requires the FM server 2 to communicate via network 5 with $\lambda$ of the authentication servers 3, where $1 \leq \lambda \leq n$. The number $\lambda$ here depends on implementation details discussed below. To initiate the protocol, FM server 2 sends a message to each of the $\lambda$ authentication servers via communications interface 7. The contents of this message depend on protocol implementation and detailed examples are given below, but the message typically includes at least the user ID uid associated with the file to be decrypted.

In step 32 of FIG. 3, the control logic 8, 12 of each server $S_i$ involved in the key-reconstruction protocol (i.e. FM server 2 and each of the $\lambda$ authentication servers 3) computes first and second hash values, denoted here by $h_i^1$ and $h_i^2$ respectively, for the required encrypted file. These hash values can be generated in various ways as illustrated by examples below, and may include various data, such as the uid, associated with the required file. However, the values $h_i^1$ and $h_i^2$ generated by a given server $S_i$ each include the secret key $k_i$ stored by that server. In step 33, the $\lambda$ authentication servers 3 send the resulting hash values $h_i^1$, $h_i^2$ back to FM server 2 via network 5. In step 34, the FM logic 8 of FM server 2 uses the first hash values $h_i^1$ generated in step 32 to compute an input password hash PH'. The resulting input password hash PH' comprises the predetermined function F of the input password p' and the secret server keys $k_i$. That is, the form of input password hash PH' corresponds directly to that of the user password hash PH, but contains the input password p' in place of the user password p. Next, in step 35, the FM logic 8 checks if the input password hash PH' matches the user password hash PH pre-stored for the received user ID. If PH' matches PH, indicated by a "Yes" (Y) at decision step 35, then the input password p' equals the user password p. In this case, operation proceeds to step 36 in which the logic 8 of FM server 2 reconstructs the encryption key $K_f$ for the required encrypted file. The reconstructed key $K_f$ encodes the input password p' (now authenticated via step 35 as equal to user password p), plus the further value(s) encoded in the key. The key reconstruction step requires use of the second hash values $h_i^2$ computed in step 32, and hence use of the secret server keys $k_i$ in these hash values. The hash values $h_i^2$ may themselves encode the input password p' and/or one or more of the further value(s) encoded in $K_f$. Alternatively, or in addition, the hash values $h_i^2$ may be used in generating such further value(s) required to reconstruct $K_f$. Examples of such key-reconstruction processes are described below. In each case, however, key-reconstruction requires use of the input password p' and, via the second hash values $h_i^1$, the secret server keys $k_i$, and only proceeds if the input password p' is authenticated in step 35 as the correct user password p for the required file. In step 37, the FM logic 8 then decrypts the encrypted file using the reconstructed key $K_f$. Depending on the application scenario, the FM server may send the decrypted file to the user, or otherwise use the decrypted data in further interaction with the user, and the decryption operation is complete. If, however, the password hashes PH' and PH do not match, i.e. decision "No" (N) at step 35, then the input password p' does not match the user password p for the user ID. The FM server 2 then aborts the decryption process in step 38, and may notify the user that authentication has failed.

The above operation provides secure management of encrypted user files whereby encryption keys can only be reconstructed by FM server 2 via interaction with one or more authentication servers 3, using the secret server keys $k_i$ via the second hash values $h_i^2$, and on successful authentication of user passwords via the first hash values $h_i^1$. The FM server can thus actively check user passwords before securely reconstructing encryption keys on behalf of authorized users. These features offer secure and highly efficient key reconstruction protocols. No software or strong secrets are required at user computers 4, and the user need only interact with a single server, i.e. FM server 2, while encryption keys are protected against offline attack on user passwords if the FM server is compromised. An adversary must corrupt at least $\lambda$ authentication servers as well as the FM server to compromise the system. In preferred embodiments $\lambda = n$, requiring corruption of all servers to compromise security. Moreover, the above system provides the basis for proactive security in server system 1, whereby secret server keys $k_i$ can be refreshed without requiring recomputation of encryption keys or resubmission of user passwords. This feature, explained for preferred embodiments below, further enhances security in that subversion of system 1 would require corruption of all the necessary servers within the same time period between key-refreshes.

Figure 4:
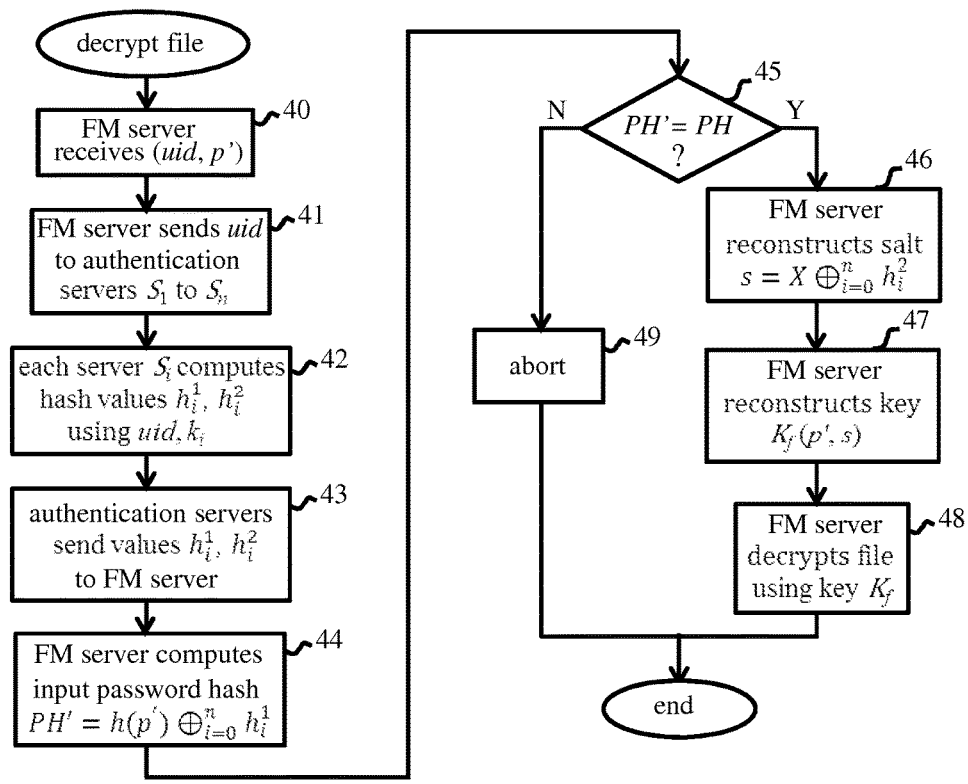
FIG. 4 indicates more detailed steps of a key-reconstruction operation in a first embodiment.
Figure 5:
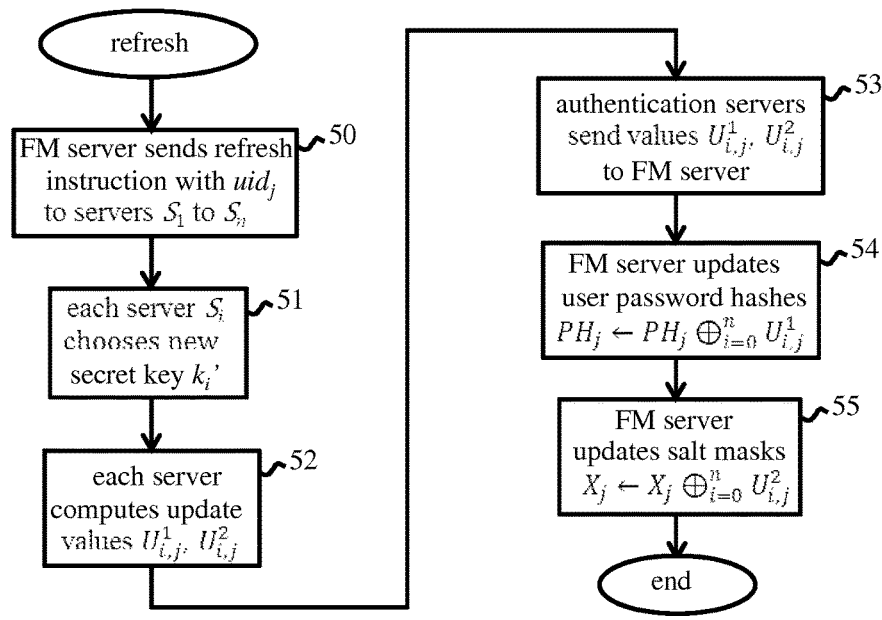
FIG. 5 indicate steps of a refresh operation in the first embodiment.

A first preferred embodiment of the above system will be described with reference to FIGS. 4 and 5. In this embodiment, the encryption key $K_f$ for an encrypted file further encodes a random salt s for that file. FM server 2 stores a salt mask X which encodes the salt s and the second hash values $h_i^2$. The salt mask X is computed by FM server 2, via interaction with authentication servers 3 to generate the second hash values $h_i^2$, in the set up procedure for the file, and the salt s is then deleted. In this embodiment, the salt mask X comprises a modulo-2 sum of the salt s and the second hash values $h_i^2$, i.e. $X = s \oplus_{i=0}^{n} h_i^2$, where $\oplus$ represents modulo-2 addition. Reconstruction of the encryption key $K_f$ for a file then requires reconstruction of the salt s for that file. FIG. 4 indicates steps of the key-reconstruction operation for decryption of a file in this embodiment. For simplicity, operation again assumes that a single encrypted file is stored for a given user, but accommodation of multiple user files is a straightforward matter as explained below.

The user ID uid and input password p' supplied by the user are received by FM server 2 in step 40 of FIG. 4. In step 41, the FM server 2 initiates the key-reconstruction protocol by sending the received user ID uid to each authentication server server $S_1$ to $S_n$ (i.e. $\lambda$=n in this embodiment). In step 42, the control logic 8, 12 of each server $S_0$ to $S_n$ computes the first and second hash values $h_i^1$ and $h_i^2$. In this embodiment, the hash values $h_i^1$, $h_i^2$ are computed by hashing respective inputs which include the user ID uid and the secret key $k_i$ of the server $S_1$. In step 43, the n authentication servers $S_1$ to $S_n$ send their hash values $h_i^1$, $h_i^2$ back to FM server 2. In step 44, the FM server 2 uses the first hash values $h_i^1$ to compute an input password hash PH' as a modulo-2 sum of an initial hash value h, which encodes the user password p', and the first hash values $h_i^1$ of all servers. That is, PH'=h(p') $\oplus_{i=0}^n h_i^1$. For example, the initial hash value h may be computed by FM server 2 by hashing an input comprising the input password p' and the user ID uid. The resulting input password hash PH' comprises the same function F of the input password p' as used to compute the user password hash PH from the user password p during setup. Thus, the pre-stored user password hash PH here comprises a modulo-2 sum of the initial hash value h, encoding user password p, and the first hash values: PH=h(p) $\oplus_{i=0}^n h_i^1$. Next, in step 45, the FM server 2 checks if the input password hash PH' matches the user password hash PH for the user ID uid. If so, operation proceeds to step 46 in which the FM server reconstructs the salt s from the salt mask X pre-stored for the required file and the second hash values $h_i^2$. In particular, the salt s is computed as a modulo-2 sum of the salt mask X and the second hash values $h_i^2$: s= X $\oplus_{i=0}^n h_i^2$. In step 47, FM server 2 then reconstructs the encryption key $K_f$ by encoding the input password p' and the reconstructed salt s in like manner to production of the key from the salt and user password during setup. For example, the encryption key $K_f$ may be produced by hashing an input comprising the input password p' and the reconstructed salt s. In step 48, the FM server then decrypts the required file using the reconstructed key $K_f$, and the operation is complete. Reverting to decision step 45, if the password hashes PH' and PH do not match here, then the decryption process is aborted in step 49 and operation terminates.

The above construction, using modulo-2 addition, provides a simple and efficient protocol in which the secret keys $k_i$ of servers $S_i$ can be refreshed in operation of system 1. In particular, each server $S_0$ to $S_n$ of this embodiment is adapted to periodically replace the current secret key $k_i$ thereof with a new secret key. The time periods, or "epochs", for which the keys $k_i$ are refreshed may be defined in various ways in the system. For example, the refresh operation may be performed automatically for epochs of a predetermined duration, and/or a new epoch may be initiated in response to detection of an attack on system 1. An example of the refresh procedure is illustrated in FIG. 5. In this example, FM server 2 initiates the refresh process by sending a refresh instruction to authentication servers $S_1$ to $S_n$ in step 50. The refresh instruction includes the user IDs $uid_j$ of all users j=0, 1, 2, ..., etc. with encrypted files in system 1. In step 51, each server $S_0$ to $S_n$ chooses a new secret key $k_i'$ to replace the current secret key $k_i$ of that server. In step 52, each server $S_i$ then computes first and second update values, denoted by $U_{i,j}^1$ and $U_{i,j}^2$ here, for the encrypted file of each user j. The first update value $U_{i,j}^1$ is a modulo-2 sum of the first hash value $h_{i,j}^1$ for the file, computed using the current secret key $k_i$, and that first hash value $h_{i,j}^1$ computed using the new secret key $k_i'$. That is: $U_{i,j}^1 = h_{i,j}^1(k_i) \oplus h_{i,j}^1(k_i')$. Similarly, the second update value $U_{i,j}^2$ is a modulo-2 sum of the second hash value $h_{i,j}^2$ for the file, computed using the current secret key $k_i$, and that second hash value $h_{i,j}^2$ computed using the new secret key $k_i'$, i.e. $U_{i,j}^2 = h_{i,j}^2(k_i) \oplus h_{i,j}^2(k_i')$. In step 53, the authentication servers $S_1$ to $S_1$, send their update values $U_{i,j}^1$ and $U_{i,j}^2$ to FM server 2, and delete the old secret key $k_i$ setting $k_i \leftarrow k_i'$. Then, in step 54, FM server 2 updates the user password hash $PH_j$ for each encrypted file by modulo-2 addition with each first update value $U_{i,j}^1$. That is, $PH_j$ (new)=$PH_j$(old) $\oplus_{i=0}^n U_{i,j}^1$. Similarly, in step 55, FM server 2 updates the salt mask for each file by modulo-2 addition with each second update value $U_{i,j}^2$. That is, $X_j$(new)=$X_j$ (old) $\oplus_{i=0}^n U_{i,j}^2$. In each case, the modulo-2 addition operation results in cancellation of the values based on the old keys $k_i$ and insertion of corresponding values based on new keys $k_i'$. The FM server 2 then deletes its old key $k_0$, setting $k_0 \leftarrow k_0'$, and the refresh operation is complete. The password hashes PH and salt masks X for all files are thus updated for use with the new server keys $k_i$ in the ensuing epoch.

The above refresh process provides proactive security in server system 1, allowing server keys to be refreshed as required without requiring recomputation of encryption keys or resubmission of user passwords. This is a significant security advantage since an adversary would need to hack all servers $S_0$ to $S_n$ in the same epoch to compromise system security. The refresh process of this embodiment may also be performed for refreshing any subset of the server keys $k_i$, and may therefore be performed for individual authentication servers 3, or for FM server 2 only, if desired.

An exemplary implementation of the above embodiment is described in detail in the following. The implementation is described for a scenario wherein user files are documents uploaded by users for secure storage in system 1. Multiple documents, each identified by a file ID did, can be uploaded by any given user. To accommodate this, the encryption key $K_f$, denoted by $K_{did}$ below, for each file further encodes the file ID did for the file. Some preliminaries are described first.

The building blocks for this construction are a hash function H : $\{0,1\}^* \rightarrow \{0,1\}^\tau$ (where * signifies arbitrary length and $\tau$ denotes length of the output string), and a one-time-pad style encryption scheme (Enc, Dec) for keys $K \leftarrow \{0,1\}^\tau$. For encryption of a message m under a key K to produce a ciphertext (encrypted file) C, $C \leftarrow$ Enc(K, m) is defined as $C \leftarrow H^*(K) \oplus m$ with $H^*(K)$ denoting the concatenation of hash outputs created as H(0, K)||H(1, K)|| ... ||H(l, K)|| where l is selected such that $|H^*(K)| \geq |m|$. Likewise, decryption m $\leftarrow$ Dec(K, C) works as m $\leftarrow H^*(K)|C$. For security, a fresh key K is chosen for every message m.

A secure channel between FM server 2 and authentication servers 3 is assumed in this construction. Specifically, communications towards servers 3 are authenticated and communications from servers 3 to FM server 2 are authenticated and confidential (encrypted). In particular, the state leaked to an adversary in a "smash-and-grab" attack on a server does not break security (past or future) of a secure channel. This can be achieved in well-known manner, e.g. using a standard security protocol such as or SSL (Secure Sockets Layer) or TLS (Transport Security Layer) with forward secure encryption and with the secret communication keys of servers and FM server certificates being stored on trusted hardware (e.g. a smart card, HSM (Hardware Security Module), TPM (Trusted Platform Module) or other secure device). Messages between servers may also include appropriate servers IDs and session IDs which are omitted in the following for simplicity.

The setup procedure for this construction comprises initialization, account creation and document creation stages as follows.

FM server $S_0$ chooses a random key $k_0 \xleftarrow{\$} \{0,1\}^\tau$ and authentication servers $S_1$ to $S_n$ choose random keys $k_i \xleftarrow{\$} \{0,1\}^\tau$.

FM server $S_0$ creates and account for a user with user ID uid and user password p with the help of authentication servers $S_1$ to $S_n$ as follows.

FM server $S_0$ sends uid to authentication servers $S_1$ to $S_n$.

Upon receiving uid, each authentication server $S_i$ computes a first hash value $h_i^1$, denoted here by $t_i^0$, as $t_i^0 = H(k_i, (0, uid))$, and sends $(uid, t_i^0)$ to FM server $S_0$.

Upon receiving $(uid, t_i^0)$ from all authentication servers $S_i$, FM server $S_0$ computes the user password hash as $PH \leftarrow H(uid, p) \oplus_{i=0}^{n} t_i^0$ where $t_0^0 = H(k_0, (0, uid))$.

FM server $S_0$ stores $(uid, PH)$ and deletes all other values, in particular all $t_i^0$ values.

FM server $S_0$ creates an encrypted file C for a user file (doc) with file ID did. The FM server and all authentication servers recompute the password hash, and the FM server checks if the newly derived password hash matches the value PH stored for the user ID. If so, the FM server derives an encryption key $K_f = K_{did}$ for the file ID did and encrypts the user file doc.

FM server. On input (uid, p', doc) from a user for a file doc with allocated file ID did, FM server $S_0$ sends a "document create" instruction with (uid, did) to authentication servers $S_1$ to $S_n$. This provides a hook for integrating some throttling mechanism at the authentication servers. (Throttling mechanisms are well known in cryptography, providing procedures for monitoring communications for user accounts and determining if any particular user account should be blocked. Throttling mechanisms generally block user accounts if behavior satisfies a predefined criterion indicative of potentially malicious action. For example, a throttling mechanism may be activated for a user account if more than a threshold number of requests are made for the uid within a given time, or are made for a suspiciously large number of user accounts. If such a throttling mechanism is activated, the server logic will refuse to service the request and may send an error message such as "connection was throttled" back to FM server 2

Server $S_1$ to $S_n$. Upon receiving (uid, did) and absent any throttling criterion, each authentication server $S_i$ computes the first hash value $h_i^1$ as $t_i^0 = H(k_i, (0, uid))$, and a second hash value $h_i^2$, denoted here by $t_i^1$, as $t_i^1 = H(k_i, (1, uid, did))$, and sends $(uid, t_i^0, t_i^1)$ to FM server $S_0$.

FM server: Upon receiving $(uid, t_i^0, t_i^1)$ from all authentication servers $S_i$, FM server $S_0$ computes the input password hash as $PH' \leftarrow H(uid, p') \oplus_{i=0}^{n} t_i^0$ where $t_0^0 = H(k_0, (0, uid))$. If $PH \neq PH'$, abort.

If PH=PH', choose a random salt $s \xleftarrow{\$} \{0,1\}^\tau$, derive an encryption key $K_{did}$ as $K_{did} = H(uid, p', did, s)$, and encrypt the file doc as $C \leftarrow Enc(K_{did}, doc)$.

Mask the used salt s as $X = s \oplus_{i=0}^{n} t_i^1$ where $t_0^1 = H(k_0, (1, uid, did,))$.

Compute a "MAC" (Message Authentication Code) of the ciphertext C as $Y = H("MAC", uid, p', did, s, C)$.

Store the document record (uid, did, C, X, Y) in database 6 and delete all intermediate values, in particular all $t_i^0$, $t_i^1$, $K_{did}$, s.

The decryption operation is described by a document retrieval process as follows. The FM server $S_o$ and all authenticating servers repeat the process of account creation and the FM server checks if the newly derived password hash PH' matches the value PH stored for the user ID. If so, the FM server reconstructs the encryption key $K_{did}$ and decrypts the ciphertext C.

FM server. In response to a login request for (uid, p', did), FM server $S_0$ sends a login instruction with (uid, did) to authentication servers $S_1$ to $S_n$. This provides the hook for a throttling mechanism at the authentication servers as described above.

Server $S_1$ to $S_n$. Upon receiving (uid, did) and absent any throttling criterion, each authentication server $S_1$ computes the first and second hash values as $t_i^0 = H(k_i, (0, uid))$ and $t_i^1 = H(k_i, (1, uid, did))$, and sends $(uid, t_i^0, t_i^1)$ to FM server $S_0$.

FM server: Upon receiving $(uid, t_i^0, t_i^1)$ from all authentication servers $S_i$, FM server $S_0$ computes the input password hash as $PH' \leftarrow H(uid, p') \oplus_{i=0}^{n} t_i^0$ where $t_0^0 = H(k_0, (0, uid))$. If $PH \neq PH'$, abort. If PH=PH':

(a) Reconstruct the salt s as $s = X \oplus_{i=0}^{n} t_i^1$ and compute the encryption key $K_{did}$ as $K_{did} H(uid, p', did, s)$.

(b) Verify that $Y = H("MAC", uid, p', did, s, C)$ and, if not, abort.

(c) Decrypt the stored ciphertext as $doc \leftarrow Dec(K_{did}, C)$. Output doc and delete all intermediate values again, in particular all $t_i^0$, $t_i^1$, $K_{did}$, s.

The refresh operation is as follows. The secret keys $k_i$, user password hashes $PH_j$ for all users j, and salt masks $X_k$ for all documents k of each user get refreshed.

FM server. FM server $S_0$ retrieves all user records $(uid_j, PH_j)$ and all document records $(uid_j, did_k, C_k, X_k, Y_k)$. The FM server sends a refresh instruction with $\{uid_j, did_k\}$ to all authentication servers $S_1$ to $S_n$.

Server $S_1$ to $S_n$. Upon receiving $\{uid_j, did_k\}$ do the following:

(a) Choose a fresh random key $k_i' \xleftarrow{\$} \{0,1\}^\tau$.

(b) For all $uid_j$, compute the first update value $U_i^1$, denoted here by $u_{i,j}^0$, as $u_{i,j}^0 \leftarrow H(k_i, (0, uid_j)) \oplus H(k_i'(0, uid_1))$ and compute the second update value $U_i^2$, denoted here by $u_{i,j,k}^1$, as $u_{i,j,k}^1 \leftarrow H(k_i, (1, uid_j, did_k)) \oplus H(k_{i'}, (1, uid_j, did_k))$ (c) Set $k_i \leftarrow k_i'$, (i.e. delete the old key) and send $\{uid_j, u_{i,j}^0, u_{i,j,k}^1\}$ to FM server $S_0$.

FM server. On receiving $\{uid_j, u_{i,j}^0, u_{i,j,k}^1\}$ from all servers $S_1$ to $S_n$, update the server key, user records $(uid_j, PH_j)$ and document records $(uid_j, did_k, C_k, X_k, Y_k)$ as follows:

(a) Choose a fresh random key $k_0' \xleftarrow{\$} \{0,1\}^\tau$.

(b) Update the user password hashes to $PH_j \leftarrow PH_j \oplus_{i=0}^{n} u_{i,j}^0$ with $u_{0,j}^0 \leftarrow H(k_0, (0, uid_j)) \oplus H(k_0'(0, uid_j))$.

(c) Update the salt masks to $X_k \leftarrow X_k \oplus_{u=0}^{n} u_{i,j,k}^1$ with $u_{0,j,k}^1 \leftarrow H(k_0, (1, uid_j, did_k)) \oplus H(k_0', (1, uid_j, did_k)$.

(d) After all records are updated, set $k_0 \leftarrow k_0'$ and delete all intermediate values.

The above construction provides a highly efficient protocol achieving full security against smash-and-grab attacks (where the adversary steals state information, including secret keys, but does not actively control the corrupted server) on up to n servers in any given epoch. The construction also provides selective security against active attacks on the FM server (where the adversary actively controls the server). Selective security means that an adversary can selectively choose records which he later wants to offline attack. However, for each chosen record, the FM server still needs the assistance of all the authentication servers, and the attack can be frustrated by an appropriate throttling mechanism as described above. The authentication servers would then detect suspicious behaviour of a corrupt FM server, e.g., if it tries to decrypt the records of all or at least a significant fraction of users, and refuse to continue their service.

Figure 6:
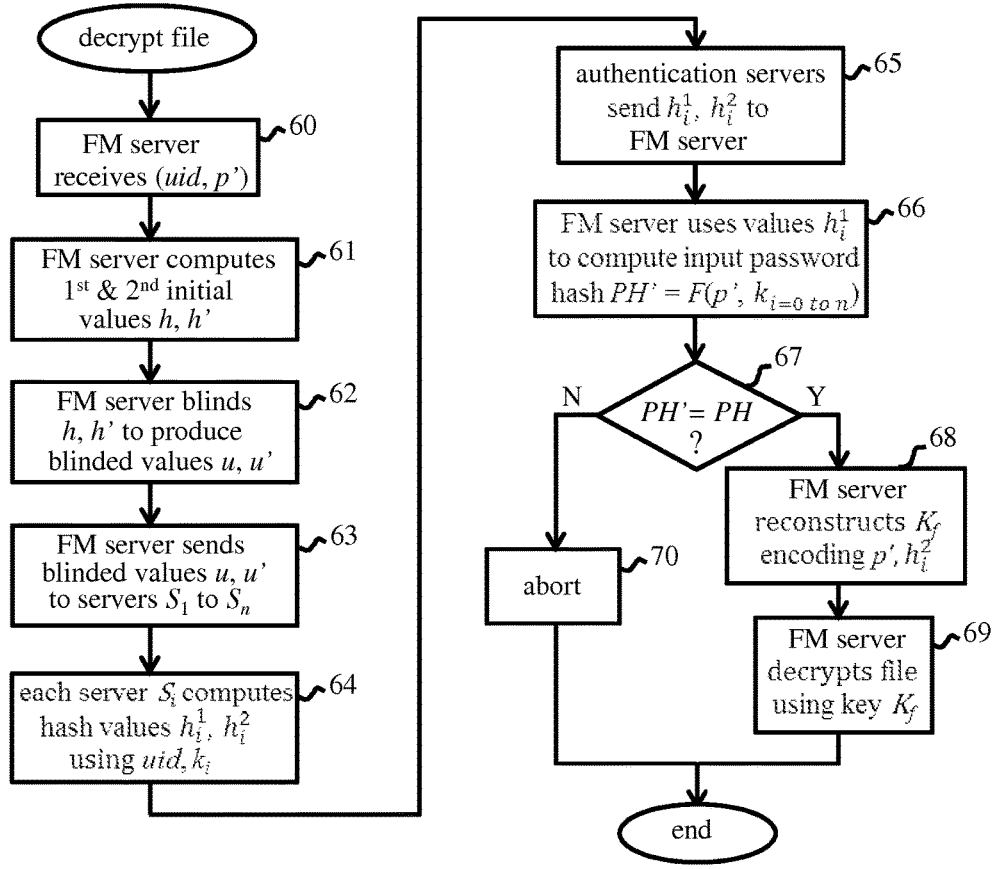
FIG. 6 indicates steps of a key-reconstruction operation in a second embodiment.

A second preferred embodiment of system 1 will now be described with reference to FIGS. 6 through 8. In this embodiment, the encryption key $K_f$ for an encrypted file further encodes the secret server keys More specifically, the secret keys $k_i$ of the servers comprise respective key-shares of a secret system key $K_s$. This system key $K_s$ is not stored in the system but is recomputed as required by combining the key-shares For example, a straightforward way to secret-share a secret key $K_s$, being an element of a group G, among servers $S_0, \ldots, S_n$ is to choose random key-shares $k_1, \ldots k_n \leftarrow_R G$ and set $k_0 \leftarrow K_s - \Sigma_{i=1}^{n} k_i$. Each server $S_i$ is given a key-share $k_i$. The key K can then be reconstructed as $K_s \leftarrow \Sigma_{i=0}^{n} k_i$. In this embodiment, the encryption key $K_f$ for each file encodes the system key $K_s$ via a combination of the key-shares $k_i$. The user password hash PH computed during setup for this embodiment also encodes the system key $K_s$ via the predetermined function F which combines the key-shares $k_i$ in the first hash values to obtain $K_s$. Reconstruction of the encryption key $K_f$ for a file involves encoding the input password p' and the second hash values via which the key-shares $k_i$ in these hash values are combined to obtain system key $K_s$. FIG. 6 indicates steps of the key-reconstruction operation for decryption of a file in this embodiment. (Again, for simplicity here, operation assumes that a single encrypted file is stored for a given user, but the system is readily extendable to multiple user files as explained below).

The user ID uid and input password p' supplied by the user are received by FM server 2 in step 60 of FIG. 6. In step 61, the FM server 2 computes each of first and second initial values, denoted here by h and h'. Each initial value h and h' is produced here via a hash function operating on an input which comprises the input password p' (and may also include other values as illustrated in the detailed implementation to follow). In step 62, the FM server 2 blinds the initial values h and h' to produce first and second blinded values, denoted here by u and u'. (Blinding is a widely-used cryptographic procedure whereby a message can be hidden, or blinded, by encoding the message using a selected function, typically combining the message with a random value such as a nonce). In step 63, the FM server sends the blinded values u, u' to each authentication server server $S_1$ to $S_n$ (i.e. $\lambda = n$ in this embodiment). In step 64, all servers $S_0$ to $S_n$ compute the first and second hash values $h_i^1$ and $h_i^2$. In this embodiment, the hash values $h_i^1$ and $h_i^2$ respectively comprise the first and second blinded values u and u' raised to the power of the secret key $k_i$ of that server (and may also include other values, such as blinding factors, described further below). In step 65, the n authentication servers $S_1$ to $S_n$ send their hash values $h_i^1$, $h_i^2$ back to FM server 2. In step 66, the FM server 2 uses the first hash values $h_i^1$ to compute an input password hash PH' as the predetermined function F of the input password p' and the system key $K_S$ obtained by combining the key-shares $k_i$ via the first hash values. The resulting input password hash PH' thus comprises the same function F of the input password p' as used to compute the user password hash PH from the user password p during setup. Next, in step 67, the FM server 2 checks if the input password hash PH' matches the user password hash PH for the user ID uid. If so, in step 68, the FM server reconstructs the encryption key $K_f$ by encoding the input password p' and the second hash values $h_i^2$. The second hash values are combined via this encoding to obtain the system key $K_S$ encoded in the encryption key. In step 69, the FM server decrypts the required file using the reconstructed key $K_f$, and the operation is complete. If, however, the password hashes PH' and PH do not match in step 67, then the decryption process is aborted in step 70 and operation terminates.

Use of the shared system key $K_s$ in this embodiment allows the secret keys $k_i$ to be refreshed by re-sharing the system key between servers $S_0$ to $S_n$. In particular, each server of the system can be adapted to periodically update its secret key $k_i$ by addition of a random share $\delta_i$ of a predetermined value p (most conveniently p=0) which is shared between the servers $S_0$ to $S_n$. The shared system key $K_s$ can then still be obtained from a combination of the new key-shares $k_i$. Such re-sharing of system key $K_s$ could be performed in known manner via interaction of the system servers $S_0$ to $S_n$. For example, for $K_s \leftarrow \Sigma_{i=0}^{n} k_i$, $S_0$ could choose random shares $\delta_1, \ldots, \delta_n \leftarrow_R G$, compute $\delta_0 \leftarrow -\Sigma_{i=1}^{n} \delta_i$, and send $\delta_i$ to $S_i$. However, in this preferred embodiment, the refresh operation is a simple, non-interactive process, performed unilaterally by each server, in which the key-shares are based on sets of master keys stored by the servers. This exploits a combinatorial secret-sharing scheme in which the random shares $\delta_i$ are computed in a different way as follows. For all pairs of servers $\{S_i, S_j\} j \neq i$, of the system choose $b_{\{i,j\}} \leftarrow_R G$ for all $0 \leq i \leq j \leq n$ and give $(b_{\{i,j\}})_{j=0, j \neq i}^{n}$ to $S_i$ for $i = 0, \ldots, n$. Note that there is a share $b_{\{i,j\}}$ for each pair of servers $\{S_i, S_j\}$, and that this share is known only to $S_i$ and $S_j$. Server $S_i$ can compute its share of zero $\delta_i$ as $\delta_i \leftarrow \Sigma_{j=0, j \neq i}^{n} \Delta_{i,j} \cdot b_{\{i,j\}}$, where "·" represents multiplication and $\Delta_{i,j} = 1$ if $i < j$ or $\Delta_{i,j} = -1$ otherwise. One can easily see that $$\Sigma_{i=0}^{n} \delta_i = \Sigma_{i=0}^{n} \Sigma_{j=0, j \neq i}^{n} \Delta_{i,j} \cdot b_{\{i,j\}} = \Sigma_{i=0}^{n} \Sigma_{j=i+1}^{n} (b_{\{i,j\}} - b_{\{i,j\}}) = 0$$

This technique, in which the $b_{\{i,j\}}$ are generated pseudo-randomly from a master key known only to servers $S_i$ and $S_j$, is used to enable each server $S_i$ to unilaterally update its key-share $k_i$ in this embodiment.

To protect the master keys used in this embodiment, each server $S_i$ may comprise first and second server compartments. The first server compartment is connectable to network 5 and is operable, though communication with other servers $S_i$ as described above, to implement the key-reconstruction protocol. The second server compartment stores the set of master keys for the server and is inaccessible from network 5 in operation of the authentication protocol. This server compartment can be protected from network 5 by hardware and/or software mechanisms which inhibit unauthorized access to the compartment from the network in operation of the protocol. Such an implementation for the servers $S_i$ is illustrated in FIG. 7. The first server compartment 71 of each server comprises a virtual machine 72, denoted by $SC1_i^{(\epsilon)}$ (where $\epsilon = 0, 1, 2$, etc., indicates epoch number), running on a cloud computing platform 73. A fresh virtual machine $SC1_i^{(0)}$, $SC1_i^{(1)}$, $SC1_i^{(2)}$, etc., is initiated on platform 73 for each of successive epochs $\epsilon = 0, 1, 2, \ldots$, etc., in operation. Cloud platform 73 may comprise one or more computers each supporting one or more virtual machines. In a typical implementation, cloud platform 73 can be realized by a single physical machine or a cluster of physical machines. The second server compartment 74, denoted by $SC2_i$, comprises a single physical machine in this example. This machine is connected only to the cloud software platform, and such connections can be physically isolated from the network 5 (here assumed to be the Internet) via which the virtual machines 72 communicate. In particular, the virtual machines) $SC1_i^{(0)}$, $SC1_i^{(1)}, \ldots, SC1_i^{(\epsilon)}$ are exposed to the Internet, while the cloud platform 73 and second compartment $SC2_i$ are run in a protected environment (the "de-militarized zone"), i.e. behind one or more firewalls deployed in the cloud platform.

The second server compartment $SC2_i$ of server 70 stores the set of master keys, denoted by $\{mk\}_i$ in the figure, for the server $S_i$. The key set $\{mk\}_i$ for server $S_i$ contains master keys $(mk_{\{i,j\}})_{j=0, j\neq i}{}^n$, for all $0 \leq i \leq j \leq n$. Each master key set $\{mk\}_i$ thus contains a respective master key $mk_{i,j}$ common to each other server $S_j$, $j \neq i$, of system 1. The master key $mk_{i,j}$ will be known only to servers $S_i$ and $S_j$. The first server compartment SC1$_i$ stores that server's current key-share $k_i$ of the system key $K_s$. The master key sets $\{mk\}_i$ for servers $S_i$ can be provided in an initialization operation of the system. For example, FM server $S_0$ may generate all master key sets $\{mk\}_i$ which are then communicated to other servers via some secure message transmission functionality $F_{smt}$. This communication may, for example, be implemented by writing the initialization data to a physical medium (such as a USB drive, disc, etc.) which is distributed to server locations by courier and loaded to the servers by an operator. Alternatively, for example, the message transmission functionality $F_{smt}$ may comprise a secure transmission channel established via a standard security protocol such as TLS or SSL.

Figure 7:
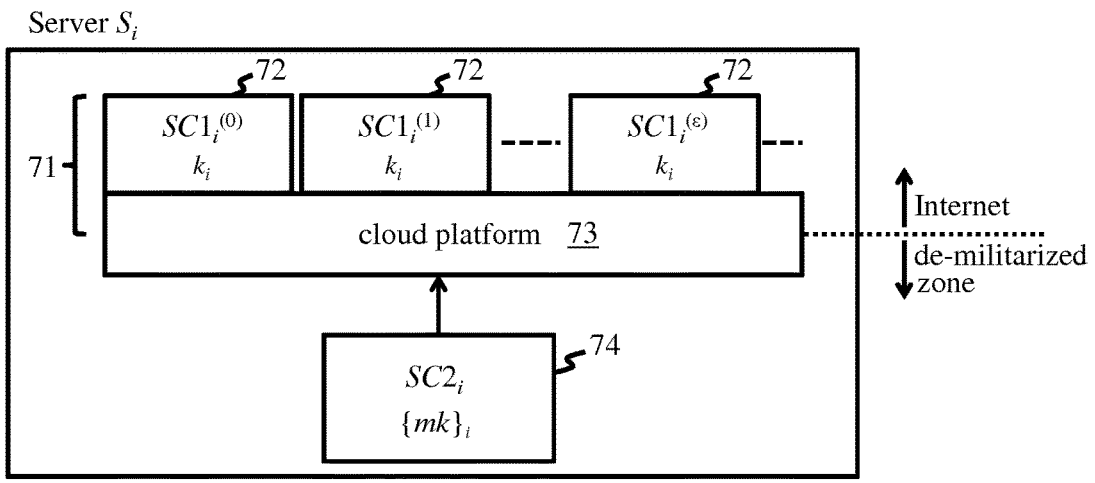
FIG. 7 is a schematic representation of an exemplary server implementation for the second embodiment.

In operation of system 1 with the server implementation of FIG. 7, time is divided into epochs separated by key refresh procedures performed by the servers. For each epoch $\epsilon$, a fresh virtual machine SC1$_i{}^{(\epsilon)}$ is set up, booted, and run on the cloud platform 73 at each server. These machines SC1$_i{}^{(\epsilon)}$ run the setup and login procedures of the key-reconstruction protocol, and read and write their states from the virtual storage provided to them by cloud platform 73. The second compartment SC2$_i$ of each server controls the cloud platform 73, maintains the images for the virtual machines SC1$_i{}^{(\epsilon)}$, and prepares the state (stored operating data) that is given to each SC1$_i{}^{(\epsilon)}$ in order for it to run the protocol procedures.

Figure 8:
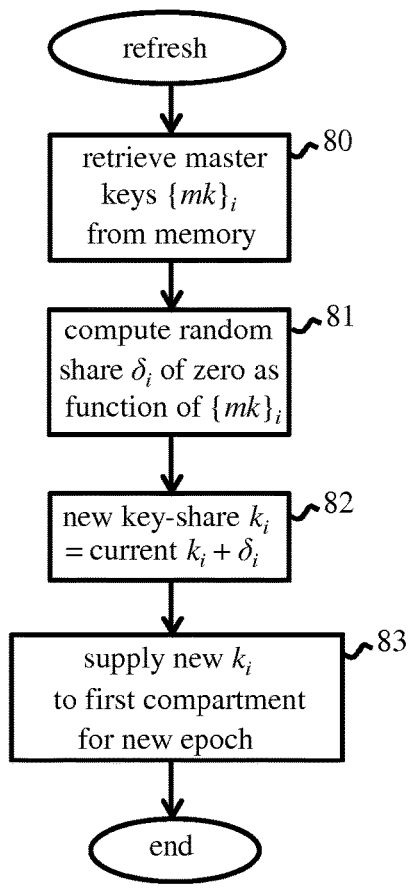
FIG. 8 indicates steps of a refresh operation in the second embodiment.

FIG. 8 indicates steps performed by the second server compartment SC2$_i$ of each server in the refresh operation for a new epoch. In a first step, step 80, of the refresh operation, the SC2$_i$ retrieves its set of master keys $\{mk\}_i$ from memory. In step 81, SC2$_i$ computes a random share $\delta_i$ of zero from its master key set $\{mk\}_i$. This step uses the combinatorial secret sharing technique explained above to compute $\delta_i$ as a combination of pseudorandom functions of respective master keys $mk_{i,j}$. In step 82, SC2$_i$ updates the current key-share $k_i$ for $S_i$ by addition of the random share $\delta_i$, i.e. set new key-share $k_i \leftarrow$ current key-share $k_i + \delta_i$. The new key-shares $k_i$ of all servers $S_i$ are thus independent of those in the previous epoch, but the sum $\Sigma_{i=0}{}^n k_i = K_S$ remains constant. In step 83, SC2$_i$ supplies the new key-share $k_i$ to the first server compartment SC1$_i$ for the new epoch. Through use of the master keys in this way, each server $S_i$ can unilaterally generate new key shares in operation, whereby proactive security is achieved without requiring communication between servers for the key refresh process.

An exemplary implementation for this embodiment is described in detail in the following. Here, again, user files are documents uploaded by users for secure storage, whereby multiple documents, each identified by a file ID did, can be uploaded by any given user. The encryption key $K_f = K_{did}$ for each file thus further encodes the file ID did for that file. Some preliminaries are described first.

H : $\{0,1\}^* \rightarrow G$ and G : $\{0,1\}^* \rightarrow \{0,1\}^\tau$ are two independent hash functions. We will also need additional independent hash functions G': $\{0,1\}^* \rightarrow \{0,1\}^\tau$, C : $z_q \rightarrow \{0,1\}^{2\tau}$, $B_0$ : $\{0,1\}^\tau \times N \rightarrow G$, $B_1$ : $\{0,1\}^\tau \times N \rightarrow G$, $B_2$ : $\{0,1\}^\tau \times N \rightarrow G$, and $B_3$ : $\{0,1\}^\tau \times N \rightarrow z_q$ modelled as random oracles. Let G be a multiplicative group of prime order $q > 2^{2\tau}$ with generator g. Let PRF$_0$ : $\{0,1\}^\tau \times N \rightarrow z_q$, PRF$_1$ : $\{0,1\}^\tau \times N \rightarrow \{0,1\}^\tau$ be pseudorandom functions and let MAC : $\{0,1\}^\tau \times \{0,1\}^* \rightarrow T$ be a message authentication code.

The setup procedure for this construction comprises initialization, account creation and document creation stages detailed below. During initialization, all parties can communicate over the secure message transmission functionality $F_{smt}$ discussed above. Afterwards, they communicate over an untrusted network, where messages can be arbitrarily observed, modified, and delayed by the adversary, but all messages are integrity-protected with a MAC. The protocol provides FM server $S_0$ with a shared MAC key $\mu_i$ with each server $S_i$, $i=1$ to n. Whenever the description below says that FM server $S_0$ sends m to $S_i$, this means that $S_0$ computes $T \leftarrow MAC(\mu_i, m)$ and sends (m, T) to $S_i$. Similarly, when $S_i$ receives m from $S_0$, this means that $S_i$ receives (m, T) and checks that $T = MAC(\mu_i, m)$, ignoring the message m if not. The communication in the other direction from server $S_i$ back to $S_0$ is protected in the same way with the same MAC key $\mu_i$. Messages may also include appropriate servers IDs and session IDs which are omitted in the following for simplicity.

Each server $S_i$, $i=0$ to n, maintains a list of blinding seeds $s_{\{i,j\}}$ for $j=0$ to n, $j \neq i$. The blinding seeds $s_{\{i,j\}}$ of each server $S_i$ are computed as pseudorandom functions of respective master keys $mk_{i,j}$ as detailed below. The blinding seeds are used to generate random shares of the unity element in G or of zero in $z_q$ using a combinatorial secret sharing scheme. In each account creation or login session, the servers $S_i$ derive fresh shares $\beta_{i,0}, \ldots, \beta_{i,3}$ of unity or zero using the hash functions $B_0, \ldots, B_3$ applied to $s_{\{i,j\}}$ and a sub-session identifier ssid, and use these shares as blinding factors for their protocol messages so that $\Pi_{i=0}{}^n \beta_{i,k} = 1$ for $k = 0, 1, 2$ and $\Sigma_{i=0}{}^n \beta_{i,3} = 0$. More precisely, $S_i$'s blinding factors are computed as $\beta_{i,k} \leftarrow \Pi_{j=0, j\neq i}{}^n B_k(s_{\{i,j\}}, ssid)^{\Delta_{i,j}}$ for $k = 0, 1, 2$ and as $\beta_{i,3} \leftarrow \Sigma_{j=0, j\neq i}{}^n \Delta_{i,j} B_3(s_{\{i,j\}}, ssid) \mod q$, where $\Delta_{i,j} = 1$ if $i < j$ and $\Delta_{i,j} = -1$ otherwise.

Each server's key-share $k_i$ and blinding seeds $s_{\{i,j\}}$ can form part of the state information $st_i$ provided to first server compartment SC1$_i$ of server $S_i$ in FIG. 7. The master keys for $S_i$ can form part of the stored data backup, held in the (trusted) memory backup of second server compartment SC2$_i$.

During initialization, all servers are running in a trusted execution environment, have access to the backup memory backup, and can communicate through the secure message transmission functionality $F_{smt}$.

FM Server $S_0$: The FM server generates and distributes master keys $mk_{\{i,j\}}{}^b$ for all servers in the system. It also generates a secret system key $K_s = K$ for a joint public key L and uses the master keys to compute its own initial key-share $k_0$ of K, as well as its initial blinding seeds $s_{\{0,j\}}$. The key-share and blinding seeds are part of $S_0$'s initial state and the master keys are kept in the backup memory backup.

(a) Set an epoch counter epoch $\leftarrow 0$.

(b) For all subsets S = {i, j} for i, j = {0, ..., n}, i $\neq$ j, choose master keys $mk_s{}^0$, $mk_s{}^1 \leftarrow^\$ \{0,1\}^\Sigma$.

(c) Choose K $\leftarrow^\$ z_q$ and set L $\leftarrow g^K$. Compute $\delta_0 \leftarrow \Sigma_{j=1}{}^n PRF_0(mk_{\{0,j\}}{}^0, epoch) \mod q$. Set $k_0 \leftarrow K + \delta_0 \mod q$.

(d) For all j = 1, ..., n, compute blinding seeds $s_{\{0,j\}} \leftarrow PRF_1(mk_{\{0,j\}}{}^1, 2 \cdot epoch)$, and MAC keys $\mu_j \leftarrow PRF_1(mk_{\{0,j\}}{}^1, 2 \cdot epoch + 1)$.

(e) Store backup$_0 \leftarrow$ (epoch, $k_0$, $(mk_{\{0,j\}}{}^{b=0,1})_{j=1}{}^n$, L) in backup memory. Set initial state $st_0$ of $S_0$ to $st_0 \leftarrow$ (epoch, $k_0$, $(s_{\{0,j\}})_{j=1}{}^n$, $(\mu_j)_{j=1}{}^n$, L).

(f) For i = 1, ..., n, securely send $(mk_{\{i,j\}}{}^{b=0,1})_{j=0, j\neq i}{}^n$ to server $S_i$ via $F_{smt}$.

Authentication Servers $S_i=S_1$ to $S_n$: Each server stores the received master keys $mk_{\{i,j\}}^b$ in backup memory and derives its initial key-share $k_i$ and blinding seeds $s_{\{i,j\}}$.
 (a) On receiving $(mk_{\{i,j\}}^{b=0,1})_{j=0,j\neq i}^n$ via $F_{smt}$, set epoch←0.
 (b) Compute $\delta_i \leftarrow \Sigma_{j=0,j\neq i}^n \Delta_{i,j} PRF_0(mk_{\{i,j\}}^0, \text{epoch}) \bmod q$ and set initial key-share to $k_i \leftarrow \delta_i$.
 (c) For all $j=0, \ldots, n$, $j \neq i$, compute blinding seeds $s_{\{i,j\}} \leftarrow PRF_1(mk_{\{i,j\}}^1, 2 \cdot \text{epoch})$, and MAC key $\mu_i \leftarrow PRF_1(mk_{\{0,i\}}^1, 2 \cdot \text{epoch}+1)$.
 (d) Store $backup_i \leftarrow (\text{epoch}, k_i, (mk_{\{i,j\}}^{b=0,1})_{j=0,1\neq i}^n)$ in backup memory and set initial state $st_i$ of $S_i$ to $st_i \leftarrow (\text{epoch}, k_i, (s_{\{i,j\}})_{j=0,j\neq i}^n, \mu_i)$.

FM server $S_o$ creates an account for a user with user ID uid and user password p with all n authentication servers as follows.

FM Server $S_0$: The FM server sends a blinded initial hash value and challenge hash to all servers $S_1$ to $S_n$.
 (a) On input (uid, p) compute an initial hash value h as $h=H(\text{uid}, p)$. Generate a random nonce $N \xleftarrow{\$} z_q$ and a random challenge $c \xleftarrow{\$} z_q$. Compute a blinded value as $u \leftarrow h^N$ and $ch \leftarrow C(c)$.
 (b) Send (ssid, u, ch) to all $S_1$ to $S_n$, where ssid is a sub-session identifier.
 (c) Store (uid, p, N, u, c) associated with ssid.

Authentication Servers $S_i=S_1$ to $S_n$: Each server sends a blinded response (first hash value $v_i$) using its secret key-share $k_i$, and the blinded first move of a zero-knowledge proof.
 (a) On receiving (ssid, u, ch) from $S_0$, compute $v_i \leftarrow u^{k_i} \beta_{i,0}$, where $\beta_{i,0} = \Pi_{j=0,j\neq i}^n B_0(s_{\{i,j\}}, \text{ssid})^{\Delta_{i,j}}$.
 (b) Choose $r_i \xleftarrow{\$} z_q$ and compute $R_{1,i} \leftarrow g^{r_i} \cdot \Pi_{j=0,j\neq i}^n B_1(s_{\{i,j\}}, \text{ssid})^{\Delta_{i,j}}$ and $R_{2,i} \leftarrow u^{r_i} \cdot \Pi_{j=0,j\neq i}^n B_2(s_{\{i,j\}}, \text{ssid})^{66\ i,j}$.
 (c) Respond by sending (ssid, $v_i$, $R_{1,i}$, $R_{2,i}$) to $S_0$.
 (d) Store ($r_i$, ch) associated with ssid.

FM Server $S_0$: The FM server sends the challenge for the zero knowledge proof.
 (a) On receiving (ssid, $v_i$, $R_{1,i}$, $R_{2,i}$) from all servers $S_1$ to $S_n$, retrieve (uid, p, N, u, c) associated with ssid.
 (b) Update the information stored with ssid to (uid, p, N, u, c, $(v_i, R_{1,i}, R_{2,i})_{i=1}^n$)).
 (c) Send (ssid, c) to all servers $S_1$ to $S_n$.

Authentication Servers $S_i=S_1$ to $S_n$: Each server checks the challenge hash from the previous round and sends the blinded last move of a zero-knowledge proof.
 (a) On receiving (ssid, c) from $S_0$, retrieve ($r_i$, ch) associated with ssid. Abort if it does not exist.
 (b) If $C(c) \neq$ ch, abort.
 (c) Compute $s_i \leftarrow k_i c + r_i + \Sigma_{j=0,j\neq i}^n \Delta_{i,j} B_3(s_{\{i,j\}}, \text{ssid}) \bmod q$.
 (d) Respond by sending (ssid, $s_i$) to $S_0$. Remove all information associated to ssid.

FM Server $S_0$: The FM server verifies the aggregated server contributions through the zero knowledge proof and computes the user password hash.
 (a) On receiving (ssid, $s_i$) from all servers $S_1$ to $S_n$, retrieve (uid, p, N, u, c, $(v_i, R_{1,i}, R_{2,i})_{i=1}^n$) stored for ssid. Abort if it does not exist.
 (b) Compute first hash value $v_0 \leftarrow u^{k_0} \cdot \Pi_{j=1}^n B_0(s_{\{0,j\}}, \text{ssid})^{\Delta_{0,j}}$. Choose $r_0 \xleftarrow{\$} z_q$, compute $R_{1,0} \leftarrow g^{r_0} \cdot \Pi_{j=1}^n B_1(s_{\{0,j\}}, \text{ssid})^{\Delta_{0,j}}$ and $R_{2,0} \leftarrow u^{r_0} \cdot \Pi_{j=1}^n B_2(s_{\{0,j\}}, \text{ssid})^{\Delta_{0,j}}$ Also compute $s_0 \leftarrow k_0 c + r_0 + \Sigma_{j=1}^n \Delta_{i,j} B_3(s_{\{0,j\}}, \text{ssid}) \bmod q$.
 (c) Compute $v \leftarrow \Pi_{i=0}^n v_i^{1/N}$, $R_1 \leftarrow \Pi_{i=0}^n R_{1,i}$, $R_2 \leftarrow \Pi_{i=0}^n R_{2,i}$ and $s \leftarrow \Sigma_{i=0}^n s_i \bmod q$. Verify that $g^s = L^c R_1$ and $u^s = v^{N^c} R_2$ and if not abort.
 (d) Store $PH = G(\text{uid}, p, v)$ as the user password hash for uid. Remove all information associated to ssid.

The zero-knowledge proof in the above procedure ensures that all servers have correctly used their key-shares $k_i$ for computation of the user password hash PH.

FM server $S_0$ creates an encrypted file C for a user file (doc) with file ID did. The FM server first checks if password hash is correct and then derives a new encryption key $K_f = K_{did}$.

FM Server $S_0$: The FM server sends first and second blinded hash values to all servers.
 (a) On input (uid, p', doc) for a file doc allocated file ID did, compute first and second initial values h and h' as $h = H(\text{uid}, p')$ and $h' = H(\text{uid}, p', \text{did})$. Generate random nonces $N, N' \xleftarrow{\$} z_q$ and a random challenge $c \xleftarrow{\$} z_q$.
 (b) Compute first and second blinded values as $u \leftarrow h^N$ and $u' \leftarrow h'^N$, and $ch \leftarrow C(c)$.
 (c) Send (ssid, u, u', ch) to all $S_1$ to $S_n$.
 (d) Store (uid, p', N, u, N', u', c) associated with ssid.

Authentication Servers $S_i=S_1$ to $S_n$: Each server sends blinded responses (first and second hash values $v_i, v_i'$) using its secret key-share $k_i$, and the first move of a zero-knowledge proof.
 (a) On receiving (ssid, u, u', ch) from $S_0$, compute $v_i \leftarrow u^{k_i} \cdot \Pi_{j=0,j\neq i}^n B_0(s_{\{i,j\}}, \text{ssid}, 0)^{\Delta_{i,j}}$ and $v_i' \leftarrow u'^{k_i} \cdot \Pi_{j=0,j\neq i}^n B_0(s_{\{i,j\}}, \text{ssid}, 1)^{\Delta_{i,j}}$
 (b) Choose $r_i \xleftarrow{\$} z_q$ and compute $R_{1,i} \leftarrow g^{r_i} \cdot \Pi_{j=0,j\neq i}^n B_1(s_{\{i,j\}}, \text{ssid})^{\Delta_{i,j}}$ and $R_{2,i} \leftarrow u'^{r_i} \cdot \Pi_{j=0,j\neq i}^n B_2(s_{\{i,j\}}, \text{ssid})^{\Delta_{i,j}}$
 (c) Respond by sending (ssid, $v_i$, $v_i'$, $R_{1,i}$, $R_{2,i}$) to $S_0$.
 (d) Store ($r_i$, ch) associated with ssid.

FM Server $S_0$. The FM server verifies the recomputed input password hash PH' against the stored user password hash PH and sends the challenge for the zero-knowledge proof.
 (a) On receiving (ssid, $v_i$, $v_i'$, $R_{1,i}$, $R_{2,i}$) from $S_1$ to $S_n$, retrieve (uid, p', N, u, N', u', c) associated with ssid. Abort if it does not exist.
 (b) Compute first hash value $v_0 \leftarrow u^{k_0} \cdot \Pi_{j=1}^n B_0(s_{\{0,j\}}, \text{ssid})^{\Delta_{0,j}}$ and $v \leftarrow \Pi_{i=0}^n v_i^{1/N}$.
 (c) Compute $PH' = G(\text{uid}, p', v)$. If $PH' \neq PH$, then abort and delete (uid, p', N, u, N', u', c) for ssid.
 (d) If $PH' = PH$, update the information stored with ssid to (uid, p', N', u', c, $(v_i', R_{1,i}, R_{2,i})_{i=1}^n$)) and send (ssid, c) to $S_1$ to $S_n$.

4. Authentication Servers $S_i=S_1$ to $S_n$: Each server checks the challenge hash from the previous round and sends the blinded last move of a zero-knowledge proof.
 (a) On receiving (ssid, c) from $S_0$, retrieve ($r_i$, ch) associated with ssid. Abort if it does not exist.
 (b) If $C(c) \neq$ ch, abort.
 (c) Compute $s_i \leftarrow k_i c + r_i + \Sigma_{j=0,j\neq i}^n \Delta_{i,j} B_3(s_{\{i,j\}}, \text{ssid}) \bmod q$.
 (d) Respond by sending (ssid, $s_i$) to $S_0$. Remove all information associated to ssid.

FM Server $S_0$: The FM server verifies the aggregated server contributions through the zero knowledge proof, computes the document key and encrypts the document.
 (a) On receiving (ssid, $s_i$) from $S_1$ to $S_n$, retrieve (uid, p, N', u', c, $(v_i', R_{1,i}, R_{2,i})_{i=1}^n$) stored for ssid. Abort if it does not exist.
 (b) Compute second hash value $v_0' \leftarrow u'^{k_0} \cdot \Pi_{j=1}^n B_0(s_{\{0,j\}}, \text{ssid})^{\Delta_{0,j}}$. Choose $r_0 \xleftarrow{\$} z_q$, compute $R_{1,0} \leftarrow g^{r_0} \cdot \Pi_{j=1}^n B_1(s_{\{0,j\}}, \text{ssid})^{\Delta_{0,j}}$ and $R_{2,0} \leftarrow u'^{r_0} \cdot \Pi_{j=1}^n B_2(s_{\{0,j\}}, \text{ssid})^{\Delta_{0,j}}$ Also compute $s_0 \leftarrow k_0 c + r_0 + \Sigma_{j=1}^n \Delta_{i,j} B_3(s_{\{0,j\}}, \text{ssid}) \bmod q$.

(c) Compute $v' \leftarrow \Pi_{i=0}^{n} v_i'^{1/N_t}$, $R_1 \leftarrow \Pi_{i=0}^{n} R_{1,i}$, $R_2 \leftarrow \Pi_{i=0}^{n} R_{2,i}$ and $s \leftarrow \Sigma_{i=0}^{n} s_i \mod q$.
Verify that $g_s = L^c R_1$ and $u'^s = v'^{N'c} R_2$ and if not abort.

(d) Derive an encryption key $K_{did}$ as $K_{did} \leftarrow G'(uid, p', did, v')$, and encrypt the file doc as $C \leftarrow Enc(K_{did}, doc)$.

(e) Store the document record (uid, did, C) and delete all other information for ssid.

The login protocol is a simplified version of account and document creation without the zero-knowledge proofs.

FM Server $S_0$: The FM server sends first and second blinded values to all servers.

(a) On input (uid, p', did), compute first and second initial values h and h' as h=H(uid, p') and h'=H(uid, p', did). Generate random nonces N, N' $\stackrel{r}{\leftarrow} z_q$ and compute first and second blinded values as $u \leftarrow h^N$ and $u' \leftarrow h'^{N'}$.

(b) Send (ssid, u, u') to $S_1$ to $S_n$.

(c) Store (uid, p', N, u, N', u') associated with ssid.

Authentication Servers $S_i = S_1$ to $S_n$: Each server sends blinded responses (first and second hash values $v_i$, $v_i'$) using its secret key-share $k_i$.

(a) On receiving (ssid, u, u') from $S_o$, compute $v_i \leftarrow u^{k_i} \cdot \Pi_{j=0, j \neq i}^{n} B_0(s_{\{i,j\}}, ssid, 0)^{\Delta_{i,j}'}$ and $v_i' \leftarrow u'^{k_i} \cdot \Pi_{j=0, j \neq i}^{n} B_0(s_{\{i,j\}}, ssid, 1)^{\Delta_{i,j}}$ (b) Respond by sending (ssid, $v_i$, $v_i'$) to $S_0$.

FM Server $S_0$. The FM server verifies the recomputed input password hash PH' against the user password hash PH and decrypts the document.

(a) On receiving (ssid, $v_i$, $v_i'$) from $S_1$ to $S_n$, retrieve (uid, p', N, u, N', u') associated with ssid. Abort if it does not exist.

(b) Compute first hash value $v_0 \leftarrow u^{k_0} \cdot \Pi_{j=1}^{n} B_0(s_{\{0,j\}}, ssid, 0)^{\Delta_{0,j}}$ and $v \leftarrow \Pi_{i=0}^{n} v_i^{1/N}$. Also compute second hash value $v_0' \leftarrow u'^{k_0} \cdot \Pi_{j=1}^{n} B_0(s_{\{0,j\}}, ssid, 1)^{\Delta_{0,j}}$ and $v' \leftarrow \Pi_{i=0}^{n} v_i'^{1/N_t}$.

(c) Compute PH'=G(uid, p', v). If PH' ≠ PH, then abort and delete all information for ssid.

(d) If PH'=PH, compute the encryption key $K_{did}$ as $K_{did}$ p', did, v') and decrypt the stored ciphertext as doc←Dec($K_{did}$, C). Output doc and delete all information for ssid.

Refresh takes place in a trusted environment with access to the backup memory.

FM Server $S_0$: Based on its backup backup$_0$ and current state $st_0$, $S_0$ computes its new state.

(a) Recover backup$_0$=(L, $k_0$, $(mk_{\{0,j\}}^{b=0,1})_{j=1}^{n}$, epoch,) and current state $st_0 = (epoch, k_0, (s_{\{0,j\}})_{j=1}^{n}, *\mu_j)_{j=1}^{n}, L)$ (b) Increase the epoch count to epoch←epoch+1. Compute $\delta_0 \leftarrow \Sigma_{j=1}^{n} PRF_0(mk_{\{0,j\}}^{0}, epoch) \mod q$. Set new key share $k_0 \leftarrow$ current key share $k_0 + \delta_0$.

(c) For all j=1, . . . , n, compute new blinding seeds $s_{\{0,j\}} \leftarrow PRF_1(mk_{\{0,j\}}^{1}, 2 \cdot epoch)$, and new MAC keys $\mu_j \leftarrow PRF_1(mk_{\{0,j\}}^{n}, 2 \cdot epoch+1)$.

(d) Store new backup$_0 \leftarrow$(L, $k_0$, $(mk_{\{0,j\}}^{b=0,1})_{j=1}^{n}$, epoch) in backup memory. Set new state of $S_0$ to $st_0 \leftarrow (k_0, (\mu_j)_{j=1}^{n}, (s_{\{0,j\}})_{j=1}^{n}, epoch, L)$.

Authentication Servers $S_i = S_1$ to $S_n$: Each server computes its new state $st_i$ based on its backup backup$_i$.

(a) Recover backup$_i$=(epoch, $k_i$, $(mk_{\{i,j\}}^{b=0,1})_{j=0, j \neq i}^{n}$,)

(b) Set epoch∂epoch+1. Compute $\delta_i \leftarrow \Sigma_{j=0, j \neq i}^{n} \Delta_{i,j} \cdot PRF_0(mk_{\{i,j\}}^{0}, epoch)$ and set new key share $k_i \leftarrow$ current key share $k_i + \delta_i \mod q$.

(c) For j=0, . . . , n, j ≠ i, compute new blinding seeds $s_{\{i,j\}} \leftarrow PRF_1(mk_{\{i,j\}}^{1}, 2 \cdot epoch)$, and new MAC keys $\mu_i \leftarrow PRF_1(mk_{\{0,i\}}^{1}, 2 \cdot epoch+1)$.

(e) Store new backup$_i \leftarrow$(epoch, $k_i$, $(mk_{\{i,j\}}^{b=0,1})_{j=0, j \neq i}^{n}$) in backup memory. Set new state of $S_i$ to $st_i \leftarrow$(epoch, $k_i$, $(s_{\{i,j\}})_{j=0, j \neq i}^{n}, \mu_i$).

The above construction provides an exceptionally secure protocol, achieving full security even against active attacks on the system servers. An adversary corrupting at most n servers (out of the FM server and the n authentication servers) per epoch cannot go offline attack any of the encrypted data by trying to guess the password.

Many changes and modifications can of course be made to the exemplary embodiments described. For example, while the second embodiment is described for a so-called "n-out-of-n" key-sharing scheme (in which all key-shares $k_i$ are used to reconstruct the shared key $K_s$, embodiments based on "t-out-of-n" (threshold) schemes can be envisaged. Here only t key-shares are required to reconstruct $K_s$, whereby the FM server need only communicate with $\lambda=t1$ authentication servers for document retrieval. For instance, Shamir's secret sharing scheme allows a secret key $K \in G$ to be shared among a set of servers $S_1, \ldots, S_n$ so that any subset of size t can recover K. Shamir's approach underlies almost all practical t-out-of-n threshold cryptography schemes. The dealer (e.g., $S_1$) chooses a random polynomial f(x) of degree t-1 such that f(0)=K, for example, by choosing random coefficients $a_1, \ldots, a_{t-1} \leftarrow_R G$ and letting $f(x) = K + a_1 x + \ldots + a_{t-1} x^{t-1}$. The dealer hands $S_i$ its key share $K_i = f(i)$. Given t different points (i, $K_i$) of the polynomial for $S_1 \subseteq \{1, \ldots, n\}$, #S=t, one can use Lagrange interpolation to reconstruct the polynomial as $$f(x) = \sum_{i \in S} \prod_{j \in S \setminus \{i\}} \frac{x-j}{i-j} K_i$$

and therefore recompute the key K=f(0) as $K = \Pi_{i \in S} \lambda_{S,i} K_i$ where $\lambda_{S,i}$ are the Lagrange coefficients $\lambda_{S,i} = \Pi_{j \in S \setminus \{i\}} j(j-i)$.

Server implementations for the first embodiment above may be based on the implementation of FIG. 7, and various other server implementations can be envisaged. For example, the initialization data (master keys, etc.) generated by $S_0$ in the above scheme could be written to a secure device such as a smart card, HSM, TPM or similar device which is then distributed to the other servers. This device may then also implement the required functionality of the second server compartment $SC2_i$. Embodiments might also be envisaged where the second server compartment SC2i is implemented by a hypervisor controlling operation of one or more virtual machines providing the first server compartment SC1i.

In general, values described as encoding specified elements may encode further elements if desired. The second embodiment can also be modified to accommodate shared values which are constants other than unity or zero in calculating the blinding factors and key-shares.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A server system comprising a file management server for communication with user computers via a network and managing encrypted files, each encrypting a user file associated with a user ID under a respective encryption key $K_f$ encoding a user password associated with that user ID, and n≥1 authentication servers for communication with the file management server via the network, wherein:
- each file management server of the system stores a respective secret key $k_i$;
- the file management server stores, for each the user ID, a user password hash comprising a predetermined function of the user password associated with that user ID and the secret keys $k_i$; and
- the file management servers of the system are adapted such that, in response to receipt from the user computer of an input password and the user ID for a required encrypted file, the file management server communicates with λ authentication servers, 1≤λ≤n, to implement a key-reconstruction protocol in which
- each file management server computes first and second hash values, including the secret key $k_i$, thereof, for the required encrypted file;
- the file management server uses the first hash values to compute an input password hash comprising the predetermined function of the input password and the secret keys $k_i$, checks if the input password hash matches the user password hash for a received user ID, and, if so, reconstructs the encryption key $K_f$ for the required encrypted file, the reconstructed key $K_f$ encoding the input password and the reconstruction requiring use of the second hash values,
- the file management server decrypts the required encrypted file using the reconstructed key $K_f$;
- the encryption key $K_f$ further encodes a random salt s for the encrypted file;
- the file management server stores a salt mask X which encodes the salt s and the second hash values; and
- the file management server is adapted, in the key-reconstruction protocol, to reconstruct the salt s from the salt mask X and the second hash values computed by the servers, and to reconstruct the encryption key $K_f$ by encoding the input password and the reconstructed salt;
- each file management server of the system is adapted to periodically replace a current secret key $k_i$ thereof with a new secret key, and to compute first and second update values for each encrypted file, the first update value being a modulo-2 sum of the first hash value computed using the current secret key and the first hash value computed using the new secret key, and the second update value being a modulo-2 sum of the second hash value computed using the current secret key and the second hash value computed using the new secret key; and
- the file management server is adapted to update the user password hash for the encrypted file by modulo-2 addition with the first update value, and to update the salt mask X for the encrypted file by modulo-2 addition with the second update value.

2. A system as claimed in claim 1 wherein the file management server is adapted to communicate with λ=n authentication servers to implement the key reconstruction protocol.

3. A system as claimed in claim 1 wherein:
- the salt mask X comprises a modulo-2 sum of the salt s and the second hash values; and
- the user password hash comprises a modulo-2 sum of an initial hash value, encoding the user password, and the first hash values.

4. A system as claimed in claim 1 wherein, in the key-reconstruction protocol:
- the file management server sends the received user ID via the network to the λ authentication servers; and
- each file management server computes the first and second hash values using the received user ID and the current secret key $k_i$, of that server.

5. A system as claimed in claim 4 wherein the encryption key $K_f$ further encodes a file ID for the encrypted file, and, in the key-reconstruction protocol:
- the file management server sends the received user ID and the file ID for the required encrypted file via the network to the λ authentication servers; and
- each file management server computes the second hash value using the received user ID, the file ID and the current secret key $k_i$, of that server.

6. A system as claimed in claim 1 wherein the encryption key $K_f$ further encodes the secret keys $k_i$ of the servers, and the file management server is adapted, in the key-reconstruction protocol, to reconstruct the encryption key $K_f$ by encoding the input password and the second hash values.

7. A system as claimed in claim 6 wherein:
- the secret keys $k_i$ of the servers comprise respective key-shares of a secret system key $K_s$;
- the encryption key $K_f$ encodes the system key $K_s$; and
- the user password hash encodes the system key $K_s$ via the predetermined function.

8. A system as claimed in claim 7 wherein each server of the system is adapted to periodically update the secret key $k_i$ thereof by addition of a random share of a predetermined value p which is shared between the servers of the system.

9. A system as claimed in claim 8 wherein p=0.

10. A system as claimed in claim 8 wherein each server $S_i$ of the system further stores a set of master keys which comprises a respective master key common to each other server $S_j$, j≠i, of the system, and wherein the random share comprises a combination of pseudorandom functions of respective master keys which is computed unilaterally by that server.

11. A system as claimed in claim 7 wherein, in the key-reconstruction protocol:
- the file management server computes each of first and second initial values via a hash function operating on the input password, blinds the first and second initial values to produce first and second blinded values respectively, and sends the first and second blinded values via the network to the λ authentication servers; and
- the first and second hash values computed by each file management server respectively comprise the first and second blinded values raised to the power of the current secret key $k_i$, of that server.

12. A system as claimed in claim 11 wherein the encryption key $K_f$ further encodes a file ID for the encrypted file, and wherein the file management server computes the second initial value via the hash function operating on the input password and the file ID for the required encrypted file.

13. A method for managing encrypted files, each encrypting a user file associated with a user ID under a respective encryption key $K_f$ encoding a user password associated with that user ID, at a file management server of a server system including n≥1 authentication servers, the file management server being adapted for communication with user computers and the authentication servers via a network, and each file management server of the system storing a respective secret key $k_i$ the method comprising, at the file management server:

storing, for each the user ID, a user password hash comprising a predetermined function of the user password associated with that user ID and the secret keys $k_i$;

in response to receipt from a user computer of an input password and a the user ID for a required encrypted file, communicating with $\lambda$ authentication servers, $1 \leq \lambda \leq n$, to implement a key-reconstruction protocol in which each file management server computes first and second hash values, including the secret key $k_i$ thereof, for the required encrypted file, and the file management server uses the first hash values to compute an input password hash comprising the predetermined function of the input password and the secret keys $k_i$ checks if the input password hash matches the user password hash for a received user ID, and, if so, reconstructs the encryption key $K_f$ for the required encrypted file, the reconstructed key $K_f$ encoding the input password and the reconstruction requiring use of the second hash values, and decrypts the required encrypted file using the reconstructed key $K_f$, wherein the encryption key $K_f$ further encodes a random salt s for the encrypted file, the method including, at the file management server:

storing a salt mask X which encodes the salt s and the second hash values;

in the key-reconstruction protocol, reconstructing the salt s from the salt mask X and the second hash values computed by the servers, and reconstructing the encryption key $K_f$ by encoding the input password and the reconstructed salt;

each file management server of the system is adapted to periodically replace a current secret key $k_i$, thereof with a new secret key, and to compute first and second update values for each encrypted file, the first update value being a modulo-2 sum of the first hash value computed using the current secret key and the first hash value computed using the new secret key, and the second update value being a modulo-2 sum of the second hash value computed using the current secret key and the second hash value computed using the new secret key; and the file management server is adapted to update the user password hash for the encrypted file by modulo-2 addition with the first update value, and to update the salt mask X for the encrypted file by modulo-2 addition with the second update value.

14. A method as claimed in claim 13 wherein the salt mask X comprises a modulo-2 sum of the salt s and the second hash values, and the user password hash comprises a modulo-2 sum of an initial hash value, encoding the user password, and the first hash values.

15. A method as claimed in claim 13 wherein the encryption key $K_f$ further encodes the secret keys $k_i$ of the servers, the method including, at the file management server:

reconstructing the encryption key $K_f$ in the key-reconstruction protocol by encoding the input password and the second hash values.

16. A method as claimed in claim 15 wherein the secret keys $k_i$ of the servers comprise respective key-shares of a secret system key $K_s$, the encryption key $K_f$ encodes the system key $K_s$, and the user password hash encodes the system key $K_s$ via the predetermined function.

* * * * *